United States Patent [19]

Cox

[11] Patent Number: 5,778,239
[45] Date of Patent: Jul. 7, 1998

[54] COMPUTER REAL TIME CLOCK POWER SUPPLY CIRCUIT

[75] Inventor: B. Tod Cox, Houston, Tex.

[73] Assignee: Compaq Computer Corporation

[21] Appl. No.: 814,557

[22] Filed: Mar. 11, 1997

Related U.S. Application Data

[63] Continuation of Ser. No. 367,004, Dec. 30, 1994, abandoned.

[51] Int. Cl.⁶ .................................................. G06F 1/28
[52] U.S. Cl. ........................................... 395/750.08
[58] Field of Search ................... 395/750, 750.08; 364/707; 307/64–66

[56] References Cited

U.S. PATENT DOCUMENTS

| | | | |
|---|---|---|---|
| 4,553,081 | 11/1985 | Koenck | 320/43 |
| 5,028,806 | 7/1991 | Stewart et al. | 307/66 |
| 5,148,042 | 9/1992 | Nakazoe | 307/65 |
| 5,148,095 | 9/1992 | Miller et al. | 320/22 |
| 5,283,905 | 2/1994 | Saadeh et al. | 395/750 |
| 5,300,874 | 4/1994 | Shimamoto et al. | 320/15 |
| 5,341,503 | 8/1994 | Gladstein et al. | 395/750 |
| 5,349,668 | 9/1994 | Gladstein et al. | 395/750 |
| 5,442,794 | 8/1995 | Wisor et al. | 395/750 |
| 5,455,499 | 10/1995 | Uskali et al. | 320/43 |
| 5,514,946 | 5/1996 | Lin et al. | 320/31 |
| 5,596,512 | 1/1997 | Wong et al. | 364/550 |

*Primary Examiner*—Glenn A. Auve
*Attorney, Agent, or Firm*—Pravel, Hewitt, Kimball & Krieger

[57] ABSTRACT

A power supply circuit is provided for a battery powered real time clock in a microprocessor based computer system. The power supply circuit monitors the output of the original battery and provides a warning indication when the battery output begins to drift or fade. A replacement battery may then be connected to the circuit. The circuit then substitutes power from the replacement battery for that from the original battery.

58 Claims, 1 Drawing Sheet

COMPUTER REAL TIME CLOCK POWER SUPPLY CIRCUIT

This is a continuation of application Ser. No. 08/367,004, filed on Dec. 30, 1994, now abandoned.

BACKGROUND OF INVENTION

1. Field Of Invention

The present invention relates to real time clock power supplies in microprocessor based computer systems.

2. Description of the Prior Art

Computer systems are provided with a real time clock as a conventional feature. Associated with the real time clock is a relatively small memory which is continuously fed power by the real time clock voltage furnished by a back up battery. It has been conventional practice to store in this memory the set-up parameters for the computer system such as the keyboard password, hard drive identification or ID number and the like.

When a back up battery used to power the continuous voltage failed, whether at the end of its service life or unexpectedly and prematurely for some reason, it became necessary to reload the memory associated with the real time clock with the set-up parameters. It has not been common practice of computer users to keep a separate record of the set-up parameters. Thus, when the real time clock power supply for the computer failed, it became necessary to reload all of the set-up parameters. Since a user often had no separate record of at least some of these parameters, a problem existed.

Further, even if the user replaced the battery prior to failure, the replacement process took a relatively long time and the contents of the memory were still lost. Thus, even preventative maintenance did not solve the problem.

SUMMARY OF INVENTION

Briefly, the present invention provides a new and improved power supply circuit for a real time clock in a computer system. The power supply circuit of the present invention allows connection of a replacement battery while the original battery is still installed. This allows an automatic substitution if an alkaline battery is being replaced and a very quick changeover if a lithium battery is being replaced.

The power supply circuit of the present invention includes a first voltage monitor which senses the output of the original battery and monitors the status of the original battery output. A connector is provided in the power supply circuit for receiving the replacement battery to receive electrical power from it for the real time clock.

A switching arrangement is connected at the supply outlet to switch supply of power from the original battery to the connector once a replacement battery is installed after an unsatisfactory status is detected by the first voltage monitor. A second voltage monitor in the power supply circuit is connected to the connector for the replacement battery, and senses the output of the replacement battery when it is connected to the connector.

With the present invention, power to the computer system real time clock is automatically switched from the original battery when the replacement battery is installed. A user is also notified when the output power from the original battery for the real time clock has deteriorated. The circuit of the present invention also disables connection between the original battery after it has exhibited unsatisfactory power output levels. This protects against any effort to recharge it and avoids potential safety problems, such as explosions.

DESCRIPTION OF PREFERRED EMBODIMENT

Figure 1:
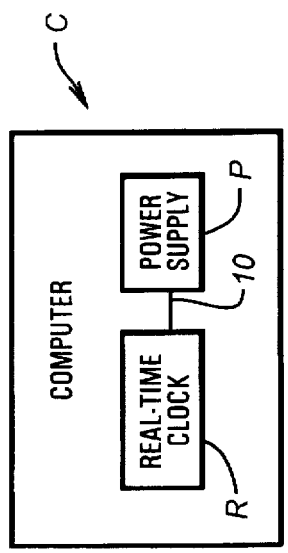
FIG. 1 is a schematic diagram of a computer system having a real time clock and a power supply circuit according to the present invention.
Figure 2:
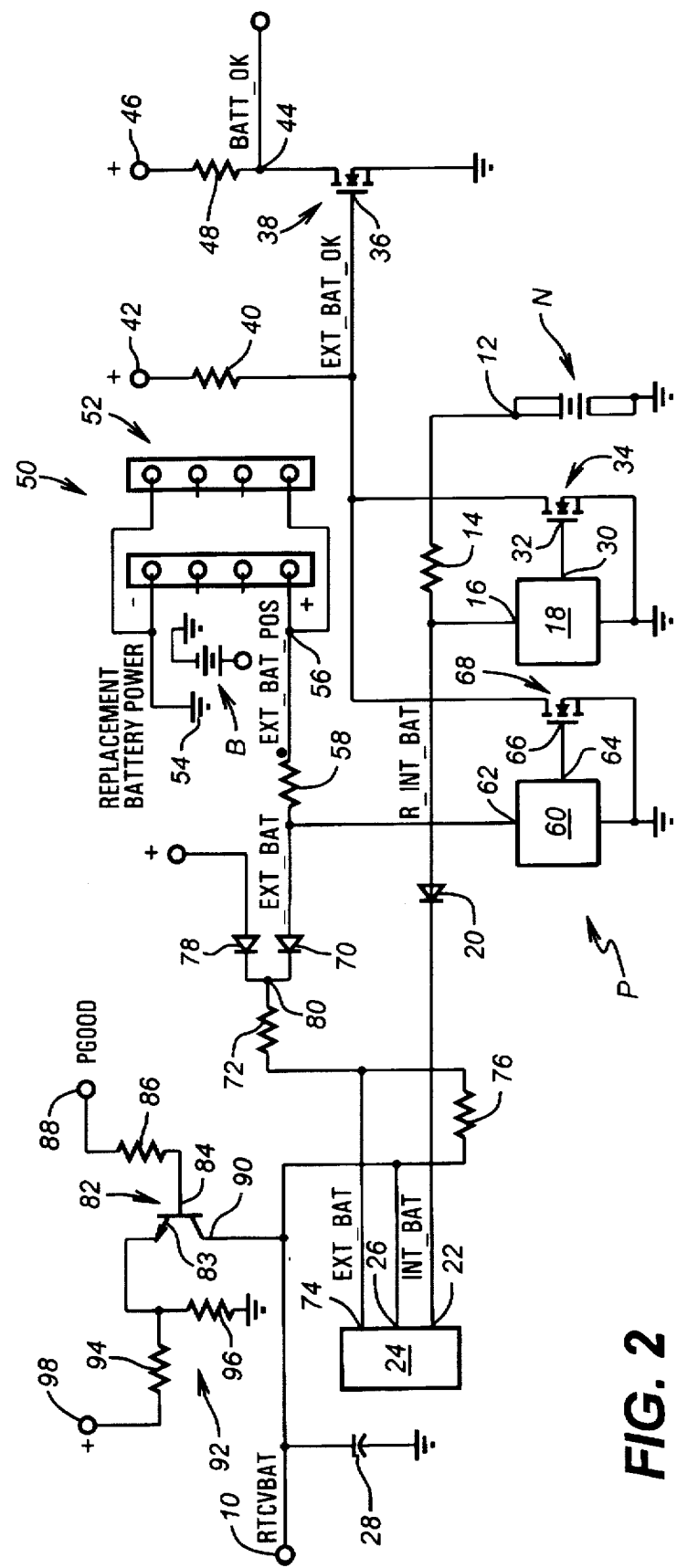
FIG. 2 is a schematic electrical circuit diagram of the power supply circuit of FIG. 1.

In the drawings, the letter C (FIG. 1) designates generally a computer system having a real time clock R with associated memory continuously receiving operating or direct current power from an original battery N (FIG. 2) through a power supply circuit P (FIGS. 1 & 2) according to the present invention. The computer C is typically a microprocessor based computer system, having a conventional real time clock R with associated memory included therein. Typically, the associated memory with the real time clock R is used to store setup parameters for the computer C. The remainder of the computer C is conventional and for this reason details of the conventional structure and components are not shown.

The power supply circuit P provides power at a supply outlet 10 to the real time clock R and associated memory. The original battery N (FIG. 2) which originally provides operating power to the real time clock R and its associated memory through the power supply circuit P is typically a non-chargeable, lithium battery because of its significantly longer service life. It should be understood, however, that other types of batteries, both chargeable and non-chargeable, could be used for the original battery N as well.

The power supply circuit P according to the present invention automatically substitutes power from a replacement battery B, which is a re-chargeable one such as an alkaline battery, for the original battery N. Power is provided at the supply outlet 10 of the power supply circuit P. The power supply circuit P detects when an unsatisfactory status in the output of either the original battery N or replacement battery B occurs. The unsatisfactory condition or status may be of several types, but occurs usually when a decrease in the voltage level below about +2.5 volts DC for lithium batteries or +2.7 volts DC for alkaline batteries.

Considering the power supply circuit P (FIG. 2) more in detail, the original battery N is coupled at its positive output terminal 12 through a coupling resistor 14 to an input terminal 16 of a first voltage monitor 18. The first voltage monitor 18 senses the output voltage and monitors the status of the original battery N. A typical voltage monitor, for example, is a TC54V voltage comparator made by Telcom Semiconductors, Incorporated. Such a monitor detects variance of one percent of the output of original battery N from the determined low output voltage, or other unsatisfactory output status of the original battery N. Example values of a low output voltage are +2.5V DC for lithium batteries, or +2.7V DC for alkaline batteries.

The output voltage from the original battery N is furnished through a protective diode 20 to an input 22 of a switch 24. Switch 24 may be either manual or electronic and is normally in a position to provide as power from an output 26 the voltage received at input 22. A manual switch is often preferred as switch 24 so that a user is required to manually perform the switching function as an additional safety measure. The output terminal 26 of switch 24 is electrically connected to power supply outlet 10. A storage or transient protection capacitor 28 is provided at the output 10, as well.

An output terminal 30 of first voltage monitor 18 indicates the status of original battery N to a gate terminal 32 of a transistor 34. If the original battery N is providing a satisfactory output, the transistor 34 is conducting. If a variance or unsatisfactory status in the output of original battery N is monitored, the output 30 of the first voltage monitor 18 is driven to a low state.

The transistor 34 is connected to a gate terminal 36 of a battery status transistor 38. The gate 36 of battery status transistor 38 is also connected through a resistor 40 to a pull up voltage terminal 42 which receives power from the regularly supplied power of the computer C.

The battery status transistor 38 is also connected at an output terminal 44 through a resistor 46 to a pull up voltage terminal 48. The output terminal 44 of battery status transistor 38 provides a battery okay or BATT_OK signal indicating the status of the battery connected to the power supply circuit P. The BATT_OK signal may be provided either as a status bit for polling or to a conventional interrupt monitor in the computer system C. In this manner, if an unsatisfactory battery condition occurs, an interrupt signal is generated in the computer C so that its operator can then install the replacement battery B in a first battery header 48 of a connector group 50 before the original battery N fails or deteriorates to an unsatisfactory output level.

The connector group 50 also preferably includes a second battery header 52 electrically connected in parallel with header 48 between a ground 54 and an output terminal 56. Each of the battery headers 48 and 52 are adapted to be connected with a replacement battery B which, as has been set forth, is usually an alkaline battery.

The output terminal 56 of connector group 50 is connected through a resistor 58 to a second voltage monitor 60 at its input terminal 62. Resistor 58 prevents a short circuit between battery and ground and also provides a test or reference point for testing purposes. The second voltage monitor 60 is preferably of the same type and function as the first voltage monitor 18, providing an output signal at an output terminal 64 to a gate 66 of a replacement battery status transistor 68 when the replacement battery B is providing power. If a variance or unsatisfactory status in the output power of replacement battery B occurs, the output terminal 64 of the second voltage monitor 60 is driven to a low state. The replacement battery status transistor 68 then causes the battery status transistor 38 to change state, causing an interrupt to be formed in the computer C in the manner set forth above.

Power from the replacement battery B when connected is provided through output terminal 56 through resistor 58 through a protective diode 70 and a resistor 72 to an input 74 of the switch 24. The switch 24 is either mechanically or electronically changeable from its normal position to a position bridging input 74 to output 26 so that operating power is furnished from the replacement battery B to the power supply output 10. A bridge resistor 76 is connected for this purpose between input 74 and output 26 of switch 24. Switch 24 also at this time prevents flow of charging current to original battery N.

A diode 78 which is electrically connected at a terminal 80 to the regular voltage of the computer C is also electrically connected between the protective diode 70 and the resistor 72. The diode 78 serves to hold terminal 80 at a higher voltage than the operating power provided at supply outlet 10 for the real time clock R when the computer C is turned on and receiving its normal operating power. Diode 70 is reverse biased because of the voltage at terminal 80 and prevents this voltage, as well as the voltage present at supply outlet 10, from causing pull up of the second voltage monitor 60. Diode 70 also prevents charging of the battery B when the computer C is turned on and is receiving normal operating power. Protective diode 20 in turn prevents voltage at terminal 80 from charging or recharging the battery N.

A transistor 82 is connected at its base 84 through a resistor 86 to a terminal 88 which receives a PGOOD indicator signal. The PGOOD indicator or status signal indicates the satisfactory presence of regular power for the computer C when the computer C is turned on. If regular power from the computer C is indicated good by the PGOOD signal at terminal 88, the transistor 82 is biased into saturation and provides a supply voltage at its collector 90 to power supply output 10. Resistors 94 and 96 of a voltage divider network 92 have impedance values which cause the voltage at emitter 90 of transistor 82 to be the normal supply voltage required by the real time clock R. Voltage divider network 92 receives operating power from the computer C at a power supply terminal 98 when the computer C is turned on and operating.

In the operation of the present invention, when the computer C is disconnected from its regular power, the original battery N provides power at the supply outlet 10 to the real time clock R. The first voltage monitor 18 continuously receives an indication of the power output level from the battery N at the input terminal 16. When an unsatisfactory output status of the original battery N is detected by the first voltage monitor 18, the output terminal 30 goes to a low state, turning off the transistor 34. This through the gate 36 causes the battery status transistor 38 to conduct, pulling down the BATT_OK signal at terminal 44.

As has been set forth, this is detected by the interrupt monitor of the computer system C. The computer operator is thus notified to install replacement battery B in the battery header 48 for an initial unsatisfactory indication of power output from the power supply circuit P to the real time clock R.

If a replacement battery is already connected to the header 48, the user may put an additional replacement battery into the battery header 52. The switch 24 is switched, either mechanically or automatically, so that the alkaline battery or batteries B are now connected to the connector group 50. The replacement battery now serves as the positive supply voltage at the output terminal 10 of the power supply circuit P for the real time clock R whenever the computer C is turned off.

Until a replacement battery B is connected into the connector group 50, the second voltage monitor 60 is disabled because it is receiving no input signal at its input terminal 62. This functions to hold replacement battery status transistor 68 in an off or open circuit state. When a replacement battery B is placed into the battery header 48, the input terminal 62 of the second voltage monitor 60 receives an input, causing the output terminal 64 to change state. This causes the replacement battery status transistor 68 to change state, and the BATT_OK signal at terminal 44 reverts to an indication of satisfactory power from the power supply circuit P. It is also to be noted that at this time, the status of the transistor 34 no longer exerts any control over the condition of the battery status transistor 38, because the transistor 34 has been turned off when the original battery N output was sensed to be unsatisfactory.

It is also to be noted that the protective diode 20 effectively excludes the original battery N from receiving any back flow of charging current. When the replacement battery B is inserted, the diode 20 is effectively reverse biased and prevents any flow of current which might be furnished to the original battery N. In this way, no inadvertent attempt can be made to recharge the original battery N.

This serves as a safety measure when the original battery N is a lithium or other type of non-chargeable battery, and is provided as an additional safety measure to the function of the switch 24. It is also preferable to change the switch 24 at this time, however, in order to protect against inadvertent charging of the original battery N in case the diode 20 should fail.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A power supply circuit for a real time clock in a computer system for automatically substituting a replacement clock battery for an original clock battery providing electrical power at a supply outlet to the real time clock, comprising:

first voltage monitor means for sensing the output of an original clock battery and monitoring the status of such original clock battery output;

connector means for receiving a replacement clock battery to receive electrical power therefrom; and means for switching supply of power at the supply outlet from an original clock battery to a replacement clock battery once a replacement clock battery is attached to said connector means without removing said original clock battery from the computer system.

2. The circuit of claim 1, further including:

second voltage monitor means connected to said connector means for sensing the output of the replacement battery when same is connected to said connector means.

3. The circuit of claim 2, further including:

a replacement battery connected to said second voltage monitor means.

4. The circuit of claim 3, wherein:

said replacement battery comprises a rechargeable battery.

5. The circuit of claim 1, further including:

means responsive to said first voltage monitor means for indicating an unsatisfactory output status of the original battery.

6. The circuit of claim 1, wherein:

said connector means comprises a plurality of battery connectors connected in parallel, each adapted to receive electrical power from a replacement battery.

7. The circuit of claim 1, wherein:

said switch means comprises an automatically operable electrical switch.

8. The circuit of claim 1, wherein:

said switch means comprises a manually operable switch.

9. The circuit of claim 1, wherein said switch means comprises:

an automatically operable electrical switch; and a manually operable switch;

each of said switches operable to switch supply of power at the supply outlet.

10. The circuit of claim 1, further including:

disabling means connected to said means for switching for disabling connection of the output of the original battery to the supply outlet when a replacement battery is attached to said connector means.

11. The circuit of claim 1, further including:

a battery connected to said first voltage monitor means.

12. In a computer system having a real time clock and an original clock battery powering the real time clock, a power supply circuit for automatically substituting a rechargeable battery for a non-chargeable battery providing electrical power at a supply outlet to the real time clock, comprising:

a clock battery to supply power to the real time clock as the original clock battery;

first voltage monitor means for sensing the output of the original clock battery and monitoring the status of the original clock battery output;

connector means for receiving a replacement clock battery to receive electrical power therefrom; and means for switching supply of power at the supply outlet from said original clock battery to said connector means once a replacement clock battery is attached to said connector means without removing said original clock battery from the computer system.

13. The computer system of claim 12, further including:

second voltage monitor means connected to said connector means for sensing the output of the replacement battery when same is connected to said connector means.

14. The computer system of claim 13, further including:

a replacement battery connected to said second voltage monitor means.

15. The system of claim 14, wherein:

said replacement battery comprises a rechargeable battery.

16. The system of claim 12, further including:

means responsive to said first voltage monitor means for indicating an unsatisfactory output status of the original battery.

17. The system of claim 12, wherein:

said connector means comprises a plurality of battery connectors connected in parallel, each adapted to receive electrical power from a replacement battery.

18. The system of claim 12, wherein:

said switch means comprises an automatically operable electrical switch.

19. The system of claim 12, wherein:

said switch means comprises a manually operable switch.

20. The system of claim 12, wherein said switch means comprises:

an automatically operable electrical switch; and a manually operable switch;

each of said switches operable to switch supply of power at the supply outlet.

21. The system of claim 12, further including:

disabling means connected to said means for switching for disabling connection of the output of the original battery to the supply outlet when a replacement battery is attached to said connector means.

22. The computer system of claim 12, wherein the computer system has a supply of regular power for the real time clock when the computer is operating and further including:

a circuit connected to the supply outlet for furnishing regular computer power to the real time clock when the computer is operating.

23. The computer system of claim 22, further including:

protective means for isolating said first voltage monitor means from the regular computer system power supply.

24. The computer system of claim 22, including:
  protective means for isolating said first voltage monitor means from the regular computer system power supply;
  second voltage monitor means connected to said connector means for sensing the output of the replacement clock battery when same is connected to said connector means; and
  protective means for isolating said second voltage monitor means from the regular computer system power supply.

25. A method of automatically substituting a replacement clock battery for an original clock battery, the computer system having a supply outlet for providing power to a real time clock, comprising the steps of:
  sensing the output of an original clock battery;
  monitoring the status of the output of the original clock battery;
  switching power at the supply outlet from the original clock battery to a replacement clock battery; and
  maintaining the original clock battery in the computer system.

26. The method of claim 25, further comprising the step of:
  maintaining power at the supply outlet at the replacement clock battery such that power at the supply outlet is not switched back to the original clock battery.

27. The method of claim 26, wherein the original clock battery is a non-rechargeable battery.

28. The method of claim 25, wherein the replacement clock battery is a rechargeable battery.

29. The method of claim 25, wherein said step of monitoring original clock battery status comprises monitoring the original clock battery status to detect a variance in the output of the original clock battery.

30. The method of claim 29, wherein a variance in the original clock battery output is detected during said step of monitoring, and wherein:
  said step of switching is performed without removing the original clock battery.

31. In a computer system having a real time clock and an original clock battery powering the real time clock, a power supply circuit for automatically substituting a replacement clock battery for the original clock battery providing electrical power at a supply outlet to the real time clock, comprising:
  an original clock battery to supply power to the real time clock;
  voltage monitor means for sensing the output of the original clock battery and monitoring the status of the original clock battery output;
  connector means for receiving a replacement clock battery to receive electrical power therefrom;
  means for switching supply of power at the supply outlet from said original clock battery to said connector means without removing said original battery when a predetermined variance is detected in the original clock battery output; and
  disabling means connected to said switching means for disabling connection of the output of the original clock battery to the supply outlet when a predetermined variance is detected in the original clock battery output.

32. The computer system of claim 31, wherein the replacement clock battery is connected to the connector means.

33. In a computer system having a real time clock and an original clock battery powering the real time clock, a power supply circuit for automatically substituting a replacement clock battery for the original clock battery providing electrical power at a supply outlet to the real time clock, comprising:
  an original clock battery to supply power to the real time clock;
  voltage monitor means for sensing the output of the original clock battery and monitoring the status of the original clock battery output;
  connector means for receiving a replacement clock battery to receive electrical power therefrom;
  disabling means for disabling connection of the output of the original clock battery to the supply outlet;
  protective means for preventing current from recharging the original clock battery; and
  means for switching supply of power at supply outlet from said original clock battery to said connector means without removing said original clock battery when the current is prevented from recharging the original clock battery by said protective means.

34. The computer system of claim 33, wherein the replacement clock battery is connected to the conector means.

35. A power supply circuit for a real time clock in a computer system for automatically substituting a replacement clock battery for an original clock battery providing electrical power at a supply outlet to the real time clock, comprising:
  a first voltage monitor for sensing the output of an original clock battery and monitoring the status of such original clock battery output;
  a connector for receiving a replacement clock battery to receive electrical power therefrom; and
  a switch for switching supply of power at the supply outlet from an original clock battery to a replacement clock battery once a replacement clock battery is attached to said connector means without removing said original clock battery from the computer system.

36. The circuit of claim 35, further including:
  a second voltage monitor connected to said connector for sensing the output of a replacement clock battery when same is connected to said connector.

37. The circuit of claim 36, further including:
  a replacement clock battery connected to said second voltage monitor.

38. The circuit of claim 37, wherein:
  said replacement clock batter comprises a rechargeable battery.

39. The circuit of claim 35, further in including:
  battery status logic responsive to said first voltage monitor for indicating an unsatisfactory output status of the original clock battery.

40. The circuit of claim 35, wherein:
  said connector comprises a plurality of battery connectors connected in parallel, each adapted to receive electrical power from a replacement clock battery.

41. The circuit of claim 35, wherein:
  said switch comprises an automatically operable electrical switch.

42. The circuit of claim 35, wherein:
  said switch comprises a manually operable switch.

43. The circuit of claim 35, wherein said switch comprises:
  an automatically operable electrical switch; and a manually operable switch;

each of said switches operable to switch supply of power at the supply outlet.

44. The circuit of claim 35, further including:

disabling logic connected to said switch for disabling connection of the output of the original clock battery to the supply outlet when a replacement clock battery is attached to said connector.

45. The circuit of claim 35, further including:

a clock battery connected to said first voltage monitor.

46. In a computer system having a real time clock and an original clock battery powering the real time clock, a power supply circuit for automatically substituting a rechargeable battery for a non-chargeable battery providing electrical power at a supply outlet to the real time clock, comprising:

a clock battery to supply power to the real time clock as the original clock battery;

a first voltage monitor for sensing the output of the original clock battery and monitoring the status of the original clock battery output;

a connector for receiving a replacement clock battery to receive electrical power therefrom; and a switch for switching supply of power at the supply outlet from said original clock battery to said connector once a replacement clock battery is attached to said connector without removing said original clock battery from the computer system.

47. The computer system of claim 46, further including:

second voltage monitor connected to said connector for sensing the output of a replacement clock battery when same is connected to said connector.

48. The computer system of claim 47, further including:

a replacement clock battery connected to said second voltage monitor.

49. The computer system of claim 48, wherein:

said replacement clock battery comprises a rechargeable battery.

50. The computer system of claim 46, further including:

status detection logic responsive to said first voltage monitor for indicating an unsatisfactory output status of the original clock battery.

51. The computer system of claim 46, wherein:

said connector comprises a plurality of battery connectors connected in parallel, each adapted to receive electrical power from a replacement clock battery.

52. The computer system of claim 46, wherein:

said switch comprises an automatically operable electrical switch.

53. The computer system of claim 46, wherein:

said switch comprises a manually operable switch.

54. The computer system of claim 46, wherein said switch comprises:

an automatically operable electrical switch; and a manually operable switch;

each of said switches operable to switch supply of power at the supply outlet.

55. The computer system of claim 46, further including:

disabling logic connected to said switch for disabling connection of the output of the original clock battery to the supply outlet when a replacement clock battery is attached to said connector.

56. The system of claim 46, wherein the computer system has a supply of regular power for the real time clock when the computer is operating and further including:

a circuit connected to the supply outlet for furnishing regular computer power to the real time clock when the computer is operating.

57. The computer system of claim 56, further including:

protection logic for isolating said first voltage monitor from the regular computer system power supply.

58. The computer system of claim 56, further including:

first protection logic for isolating said first voltage monitor from the regular computer system power supply;

second voltage monitor connected to said connector for sensing the output of the replacement clock battery when same is connected to said connector and;

second protection logic for isolating said second voltage monitor from the regular computer system power supply.

* * * * *